United States Patent
Sharma et al.

(10) Patent No.: US 10,135,693 B2
(45) Date of Patent: Nov. 20, 2018

(54) SYSTEM AND METHOD FOR MONITORING PERFORMANCE OF APPLICATIONS FOR AN ENTITY

(71) Applicant: Wipro Limited, Bangalore (IN)

(72) Inventors: Rohit Sharma, Haridwar (IN); Amit Kumar Singh, Berhampur (IN)

(73) Assignee: WIPRO LIMITED, Bangalore (IN)

( * ) Notice: Subject to any disclaimer, the term of this patent is extended or adjusted under 35 U.S.C. 154(b) by 58 days.

(21) Appl. No.: 14/830,936

(22) Filed: Aug. 20, 2015

(65) Prior Publication Data

US 2017/0005904 A1 Jan. 5, 2017

(30) Foreign Application Priority Data

Jun. 30, 2015 (IN) .......................... 3327/CHE/2015

(51) Int. Cl.
| | | |
|---|---|---|
| G06F 15/173 | (2006.01) | |
| H04L 12/24 | (2006.01) | |
| G06F 11/34 | (2006.01) | |
| G06F 11/32 | (2006.01) | |

(52) U.S. Cl.
CPC ........ *H04L 41/147* (2013.01); *G06F 11/3409* (2013.01); *G06F 11/3495* (2013.01); *H04L 41/5009* (2013.01); *H04L 41/5032* (2013.01); *H04L 41/5035* (2013.01); *G06F 11/32* (2013.01); *G06F 11/3419* (2013.01); *G06F 2201/865* (2013.01)

(58) Field of Classification Search
CPC ............... H04L 41/147; H04L 41/5009; H04L 41/5032; H04L 41/5035
USPC .................................. 709/223, 224
See application file for complete search history.

(56) References Cited

U.S. PATENT DOCUMENTS

| | | | |
|---|---|---|---|
| 5,960,196 A | 9/1999 | Carrier, III et al. | |
| 6,430,615 B1 * | 8/2002 | Hellerstein | H04L 12/2602 709/202 |
| 7,802,145 B1 | 9/2010 | Bainbridge et al. | |
| 8,015,454 B1 * | 9/2011 | Harrison | G06F 11/3409 714/47.3 |
| 8,453,027 B2 | 5/2013 | Bartz et al. | |

(Continued)

OTHER PUBLICATIONS

European International Search Report issued in the European Patent Office in counterpart European Application No. 15201795.0, dated Apr. 13, 2017, 9 pages.

*Primary Examiner* — Michael Won
(74) *Attorney, Agent, or Firm* — Finnegan, Henderson, Farabow, Garrett & Dunner, LLP

(57) ABSTRACT

Embodiments of present disclosure disclose a method for monitoring performance of applications for an entity. The method comprises retrieving performance information associated with an application from one or more sources. Then, performance of the application is analyzed using the retrieved performance information. Then, the method comprises identifying one or more entity variables affecting the performance of the application from the analyzed performance of the application. Then, at least one of trends of the performance of the application, deviations in the performance of the application, performance data related to the performance of the application and prediction data related to predicted performance of the application is determined based on the identification for monitoring the performance of the application for the entity.

27 Claims, 14 Drawing Sheets

(56) References Cited

U.S. PATENT DOCUMENTS

| | | | |
|---|---|---|---|
| 8,572,679 B1* | 10/2013 | Wang | G06F 8/65 370/328 |
| 8,813,039 B2 | 8/2014 | Maczuba | |
| 8,954,309 B2* | 2/2015 | B'Far | G06F 11/302 703/13 |
| 2004/0088386 A1* | 5/2004 | Aggarwal | G06F 11/3495 709/220 |
| 2004/0172513 A1* | 9/2004 | Nelson | G06F 11/073 711/170 |
| 2005/0149940 A1* | 7/2005 | Calinescu | G06F 9/5061 718/104 |
| 2005/0278703 A1* | 12/2005 | Lo | G06F 11/0709 717/126 |
| 2006/0218450 A1 | 9/2006 | Malik et al. | |
| 2008/0072007 A1* | 3/2008 | Zagatta | G06F 12/023 711/170 |
| 2009/0013208 A1 | 1/2009 | DiMuzio | |
| 2009/0199196 A1 | 8/2009 | Peracha | |
| 2009/0249279 A1 | 10/2009 | Bourdon | |
| 2010/0042970 A1* | 2/2010 | Gibbs | G06F 11/3684 717/106 |
| 2010/0192132 A1 | 7/2010 | Yuan et al. | |
| 2011/0231854 A1 | 9/2011 | Augenstein et al. | |
| 2012/0185735 A1 | 7/2012 | Sambamurthy et al. | |
| 2012/0266026 A1* | 10/2012 | Chikkalingaiah | G06F 11/0751 714/38.1 |
| 2013/0060933 A1* | 3/2013 | Tung | G06F 11/3495 709/224 |
| 2013/0290641 A1* | 10/2013 | Corrie | G06F 12/023 711/133 |
| 2014/0141768 A1 | 5/2014 | Javaid et al. | |
| 2015/0317189 A1* | 11/2015 | Georgescu | G06F 9/5061 718/104 |
| 2017/0005904 A1* | 1/2017 | Sharma | H04L 43/045 |

* cited by examiner

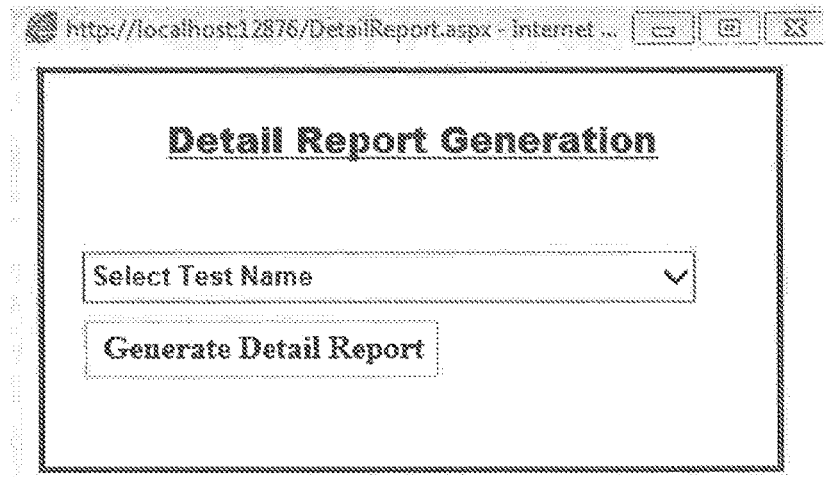

FIGURE 4a

Test Summary

Test Description
R142 Extended Load Test was executed for 10 hours steady state on Stress 2

Test Details
| | |
|---|---|
| Total Concurrent Users: | 4866 |
| Test starting time (mm/dd/yyyy) | 3/17/2014 07:16:00 CST |
| Test End Time (mm/dd/yyyy) | 3/17/2014 19:32:00 CST |
| Rampup time for user: | 04:33:00 (HH:MM:SS) |
| Steady State duration time: | 7.07 (HH:MM) |
| Number of Scripts: | 136 |

Environment & Code Changes :
R142 code deployment were done on stress
CMR Db changes are done with false flag enabled
RSM code deployed.

Test Analysis
1. Average response time of Authentication was in the range of 0.604-3.275 sec.
2. Average response time of Book Of Business was in the range of 0.000-5.937 sec.
3. Average response time of CitiPlanner was in the range of 0.006-11.145 sec.
4. Average response time of Eclipse-360 View was in the range of 0.998-4.579 sec.
5. Average response time of Eclipse-ECRM was in the range of 0.447-9.464 sec.
6. Average response time of Eclipse-Greet was in the range of 0.607-0.607 sec.
7. Average response time of Eclipse-Signoff was in the range of 0.982-1.520 sec.
8. Average response time of ECRC was in the range of 0.527-6.959 sec.

FIGURE 4b

Findings/Defects

Below are the Observations from this test:

1. The Failure Percentage is more than 10 for below transactions..

| Transaction Name | Failure Percentage |
|---|---|
| UC02_CustomerName_Address_Search | 32.38 |
| UC14_MaintainanceDistribution_Done | 28.01 |
| UC14_OnlineReports_TeamAgentPR_Search | 27.21 |
| UC18_letter_delivered_PhotoCpy_Stmt | 25 |
| UC26_RollOver_Click_BOB | 19.52 |
| UC26_CreateAppointment | 17.65 |
| UC25_RM_AddedPoPUp_Ok | 17.48 |
| UC18_letter_delivered_Misc_Case | 17.2 |
| UC13_eCRC_OfferSearch_CampaignID | 15.83 |
| IVR_GetPartyOfferList | 12.25 |

2. Average response time for below transactions is more than 6 sec.

| Transaction Name | Avg Response Time(Sec) |
|---|---|
| UC24_SAO_Customer_session_set_up | 15.42 |
| UC12_Business_Click_CitiplannerLink | 11.146 |
| UC14_OnlineReports_OfferDashBoard_FindNow | 9.464 |
| UC12_SB_Tab_ProductPalette | 9.313 |
| UC02_Src06_SUBMIT_CustName_Address_Sea | 8.337 |
| UC18_ClickSubmit_PreCoverLetter | 8.17 |
| UC23_ST_Select_Payment_RadioBtn | 7.046 |
| UC02_CustomerName_Address_Search | 7.001 |
| UC13_eCRC_Documentum_Retrieval | 6.959 |
| UC12_Click_ExtrnalPosition_Icon | 6.799 |
| UC12_Click_BusinessBanking | 6.683 |
| UC12_Click_ViewReport_Icon | 6.616 |

Test Observations:

Response Time of 360 profile search transactions were normal.
For High Response time we have high defect raise #5759,#6012,#6016,#6101.
We were getting " error in service error " For ECRM intermittently raised a SS # 6887 for the same.

FIGURE 4b (Continued)

| Functionality | SLA | Average Response time Range (Sec) | 90pc Response time (Sec) | % Passed SLA |
|---|---|---|---|---|
| Authentication | 3 | 1.534 | 1.941 | 73 |
| Book of business | 3 | 1.378 | 1.731 | 94 |
| CitiPlanner | 3 | 1.932 | 2.659 | 84 |
| Eclipse-360 view | 3 | 2.362 | 3.025 | 72 |
| RSM-ST | 3 | 1.192 | 1.559 | 91 |

FIGURE 4b (Continued)

Throughout Analysis and user simulator report
    Detailed Response
        Times

| Screen | SLA (Sec) | Overall Test | | | | % Passed SLA |
|---|---|---|---|---|---|---|
| | | Total Transactions | | Average Response | 90pc Response | |
| | | Success | Failures | | | |
| Authentication | | | | | | |
| Click_Customer Link | 3 | 580563 | 234 | 0.604 | 0.732 | 100 |
| Login_Eclipse | 3 | 25620 | 9 | 3.275 | 4.078 | 21 |
| UC26_BCB_Boo lBr | 3 | 148 | 0 | 1.513 | 1.969 | 95 |
| RSM-ST | 3 | 148 | 0 | 3.656 | 4.437 | 2 |

FIGURE 4b (Continued)

| Based on Avg Response Time | Count |
|---|---|
| # of Txn Types < 5secs | 827 |
| # of Txn Types > 6 secs & < 12 secs | 24 |
| # of Txn Types > 12 secs & < 45 secs | 1 |
| # of Txn Types > 45 secs | 0 |

| Based on 90% percent Response Time | Count |
|---|---|
| # of Txn Types < 5secs | 800 |
| # of Txn Types > 6 secs & < 12 secs | 43 |
| # of Txn Types > 12 secs & < 45 secs | 9 |
| # of Txn Types > 45 secs | 0 |

TBCO Response Times

Report for Successful Transactions

E2E Success Cases with 80 and 90 Percentile information

| Operation Name | Channel | Success Count | E2E Max | E2E Min | E2E Avg | E2E 80 | E2E 90 |
|---|---|---|---|---|---|---|---|
| AccountSearchInq | ECL | 861 | 4800 | 142 | 282 | 293 | 344 |
| addOffer | ECL | 2574 | 1366 | 105 | 217 | 247 | 279 |
| AddPipeline | ECL | 12680 | 1009 | 84 | 124 | 141 | 163 |
| CaseSearchInq | ECL | 2228 | 3352 | 283 | 484 | 564 | 588 |

FIGURE 4d

Host Response Times

| Host | Total Pass Transactions | Total Fail Transactions | Avg Resp Time (ms) | Errors |
|---|---|---|---|---|
| CitiLink | NA | NA | NA | NA |
| CMR | 1777411 | 509 | 229.87 | 1587 |
| GCIF | NA | NA | NA | NA |
| IBS | NA | NA | NA | NA |
| TPS | 1206417 | NA | 30.423 | NA |

FIGURE 4e

| Server Utilizations | | |
|---|---|---|
| Server | CPU% | Memory% |
| Batch Server | 14.79 | 14.06 |
| Cluster 4-Oracle RAC GG ESB/LEAP, Admin, | 38.63 | 90.14 |
| CMR EMS Server | 1.34 | 4.78 |
| CMR Front End Server | 1.29 | 28.7 |
| CMR MDM Server | 0.81 | 16.96 |
| COPS Oracle DB | 70.82 | 64.46 |
| Eclipse Lite WAS | 0.8 | 16.23 |
| Filenet Oracle DB Server | 21.35 | 96.52 |
| Filenet websphere server | 16.46 | 71.46 |
| GRS RNASPM Oracle DB Server | 20.46 | 66.93 |

Comparison Report Generation

Please select (Min: 2 and Max: 8) tests for comparison:

2014.10MNAMBNKALL
09/17/2014 LOAD -TEST 334 (13:13:00)
09/18/2014 EXTENDED_LOAD -TEST 335 (12:23:00)
09/30/2014 LOAD -TEST 351 (12:10:00)
10/01/2014 LOAD -TEST 357 (12:52:00)
10/02/2014 LOAD -TEST 360 (15:54:00)
10/03/2014 LOAD -TEST 409 (12:08:00)

2014.11RNAMBNKALL
10/16/2014 LOAD -TEST 408 (15:46:00)
10/17/2014 LOAD -TEST 407 (10:59:00)
10/18/2014 EXTENDED_LOAD -TEST 406 (05:42:00)
10/20/2014 LOAD -TEST 410 (08:09:00)
10/21/2014 LOAD -TEST 411 (15:49:00)
10/22/2014 LOAD -TEST 414 (14:05:00)
10/23/2014 EXTENDED_LOAD -TEST 418 (14:23:00)
10/24/2014 LOAD -TEST 416 (12:41:00)
10/27/2014 LOAD -TEST 420 (15:13:00)
10/28/2014 LOAD -TEST 430 (14:58:00)

Please make your selection for which you want the Comparison Report to be generated:

E2E Transaction's
CPU/Memory Utilization
ESB
Host Resp

[Generate Report]

FIGURE 6

SYSTEM AND METHOD FOR MONITORING PERFORMANCE OF APPLICATIONS FOR AN ENTITY

PRIORITY CLAIM

This U.S. patent application claims priority under 35 U.S.C. § 119 to India Application No. 3327/CHE/2015, filed Jun. 30, 2015. The entire contents of the aforementioned application are incorporated herein by reference.

TECHNICAL FIELD

The present subject matter is related, in general to information technology and systems management and more particularly, but not exclusively to a monitoring system and method for monitoring performance of applications for an entity.

BACKGROUND

Generally, entity such as organization, industries, companies, departments etc. makes use of software applications to detect bugs. The bugs may be software bugs or defects which are the common terms to describe errors, flaws, mistakes, failures, or faults in a computer program or software programming applications or systems. Such bugs produce incorrect or unexpected results. Occurrences of the bugs affect performance of one or more infrastructures of the entity. The performance of the one or more infrastructures include, without limitations, functioning of the software applications, performance of operating systems used to run the software applications, performance of servers utilized towards running of the software application, performance of one or more databases accessed for the software applications etc. and/or causes one or more infrastructures to behave in unintended ways.

Typically, in one conventional method, two sets of performance metrics of the software applications are closely monitored. The first set of performance metrics defines the performance experienced by end users of the software applications. One example of performance experienced by end users is average response time under peak load. The components of the set include, without limitations, load and response time where the 'load' is the volume of transactions processed by the software application and the 'response time' is the time required for a software application to respond to a user's actions at such a load. The second set of performance metrics measures the computational resources used by the software applications for the load. In such a case, an adequate capacity to support the load and possible locations of a performance bottleneck i.e. bugs are indicated. Further, in the conventional method, each of the metrics is consolidated and reports are generated on the performance of each application using the consolidated metrics to present the application performance data. However, the consolidation of each metric includes collection and processing of performance statistics from various tools and stake holders. In such a way, processing of the various system details consume high amount of manual efforts due to complex and large application infrastructure components. For example, two persons takes two days to generate a detail report, two persons take one day to generate a comparison report, one person takes four hours to generate a Hypertext Mark-up Language (HTML) report. Due to such difference of tasks performed by each person to generate the reports delays in generating the consolidated report. Further, maintenance of the history of performance reports for comparison between the past and present application performance is a challenge due to a huge amount of data from complex and large infrastructure components for analysis and report generation.

In one conventional method, the report is generated by retrieving data from various application components, by analyzing the reports, by comparing/correlating the various performance parameters with each other and/or with predefined parameters. In such a way, root causes to the generation of the bugs are identified. Further, the correlated results are presented in different formats based on the business requirements. However, with the complex infrastructure details, there exists a challenge to deliver the correlated reports within the compliance targets due to one or more problems. Typically, the one such problem is logging onto each and every network component, different websites, several backend infrastructure layers and collecting results from various stake holders for every test run on timely basis is a tedious process which takes huge amount of time and also depends on the stakeholder. Another such problem is analyzing the data gathered from the various infrastructure layers which is a time consuming activity and prone to human error. Another problem arises for comparing the reports for providing performance trends between different releases i.e. different versions of the software applications being used. Such problem is due to the huge amount of data, vast infrastructure and analyzing 'n' number of the reports for each infrastructure layer. Further, the problem includes difficulty to maintain the different repositories i.e. storages for storing all the performance results or performance data or performance statistics due to high space utilization of non-collated result files and folders.

SUMMARY

Disclosed herein is a method for monitoring performance of applications for an entity. The method comprises retrieving performance information associated with an application from one or more sources. Then, performance of the application is analyzed using the retrieved performance information. Then, the method comprises identifying one or more entity variables affecting the performance of the application from the analyzed performance of the application. Then, at least one of trends of the performance of the application, deviations in the performance of the application, performance data related to the performance of the application and prediction data related to predicted performance of the application is determined based on the identification for monitoring the performance of the application for the entity.

In an aspect of the present disclosure, a monitoring system for monitoring performance of application for an entity is disclosed. The monitoring system comprises a processor and a memory communicatively coupled to the processor. The memory stores processor-executable instructions, which, on execution, cause the processor to retrieve performance information associated with an application from one or more sources. The processor analyzes performance of the application using the retrieved performance information. The processor identifies one or more entity variables affecting the performance of the application from the analyzed performance of the application. The processor determines at least one of trends of the performance of the application, deviations in the performance of the application, performance data related to the performance of the application, and prediction data related to predicted performance of the application based on the identification for monitoring the performance of application for the entity.

In another aspect of the present disclosure, a non-transitory computer readable medium for monitoring performance of applications for an entity is disclosed. The non-transitory computer readable medium includes instructions stored thereon that when processed by a processor causes retrieving performance information associated with an application from one or more sources. Then, performance of the application is analyzed using the retrieved performance information. Next, one or more entity variables affecting the performance of the application are identified from the analyzed performance of the application. At least one of trends of the performance of the application, deviations in the performance of the application, performance data related to the performance of the application, and prediction data related to predicted performance of the application is determined based on the identification for monitoring the performance of application for the entity.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figures 4B, 4C:
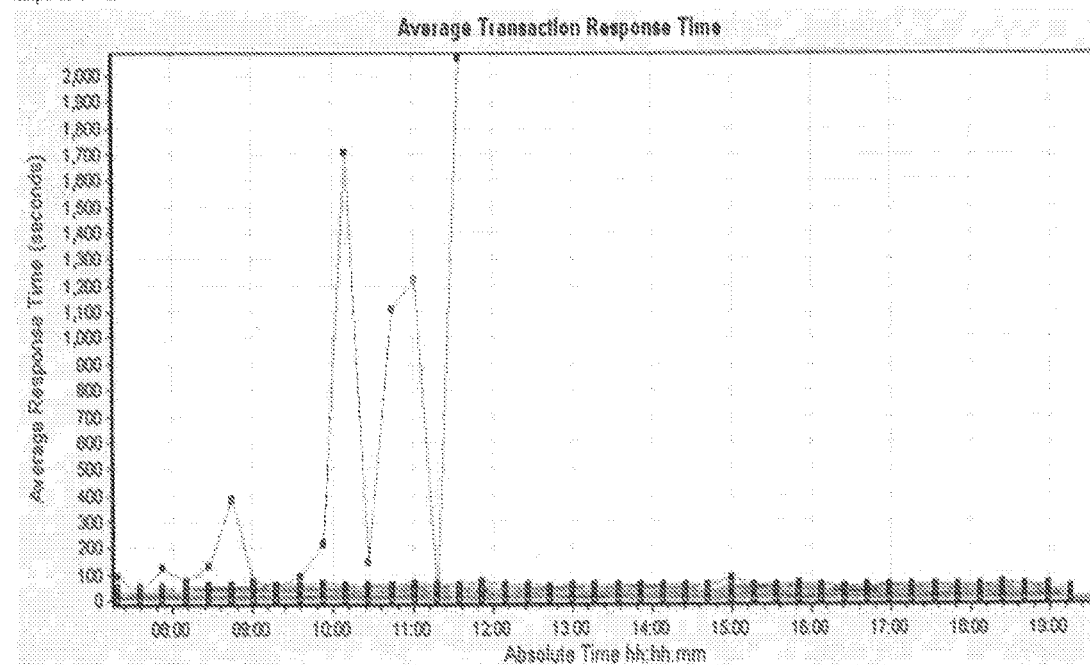
Figure 4C:
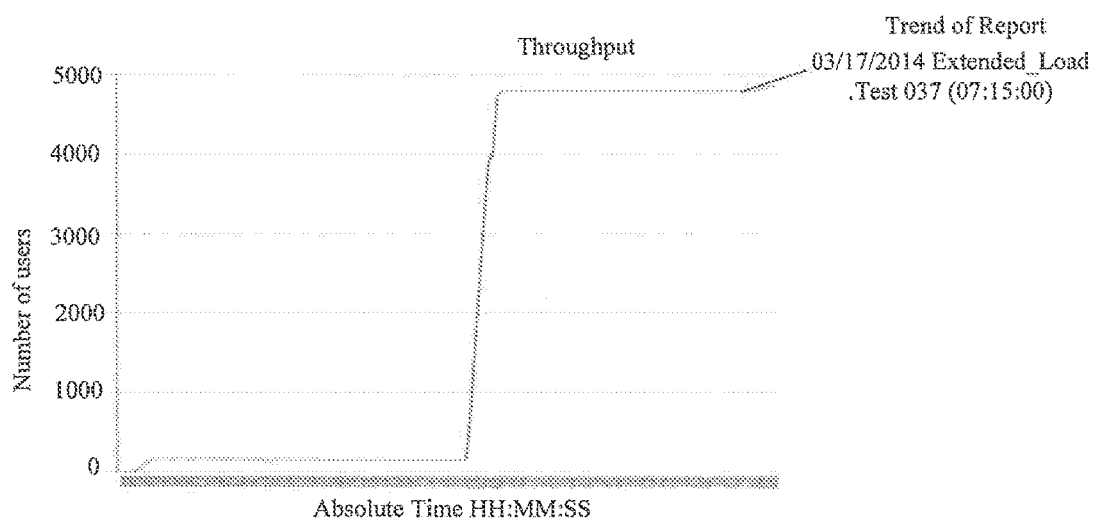
Figure 4C:
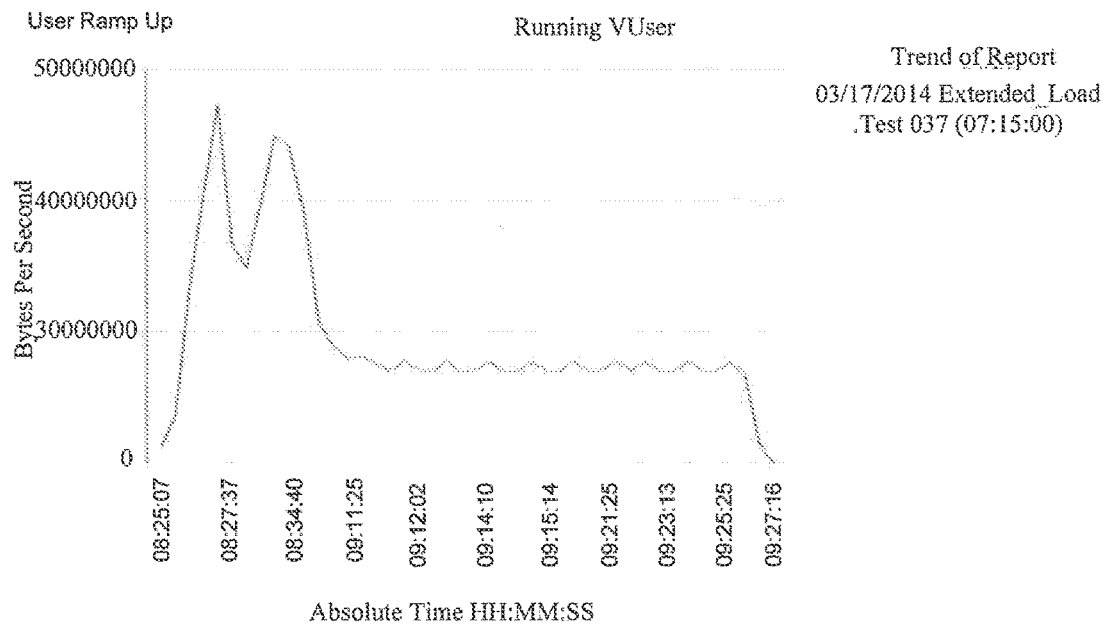
Figure 7:
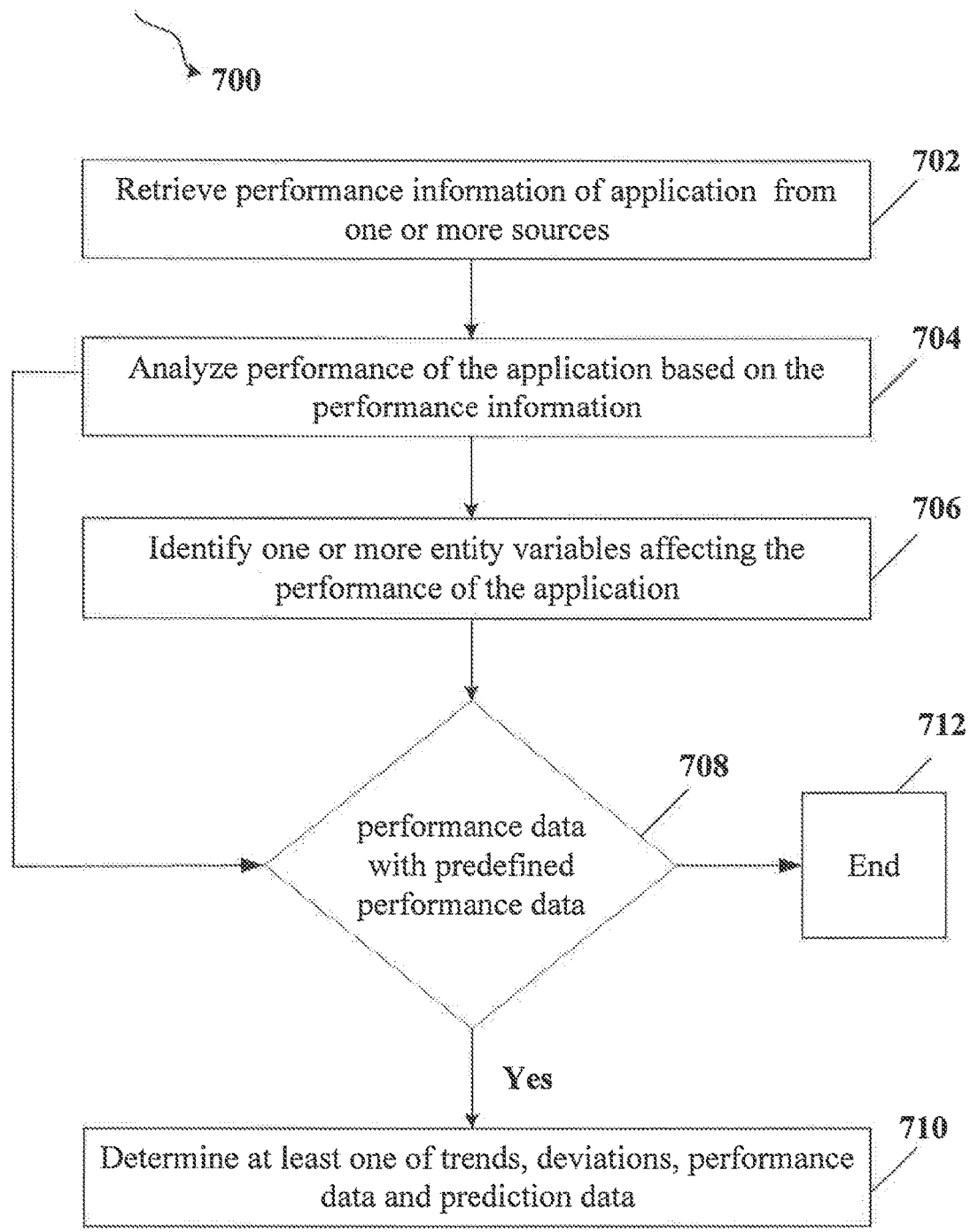
Figure 8:
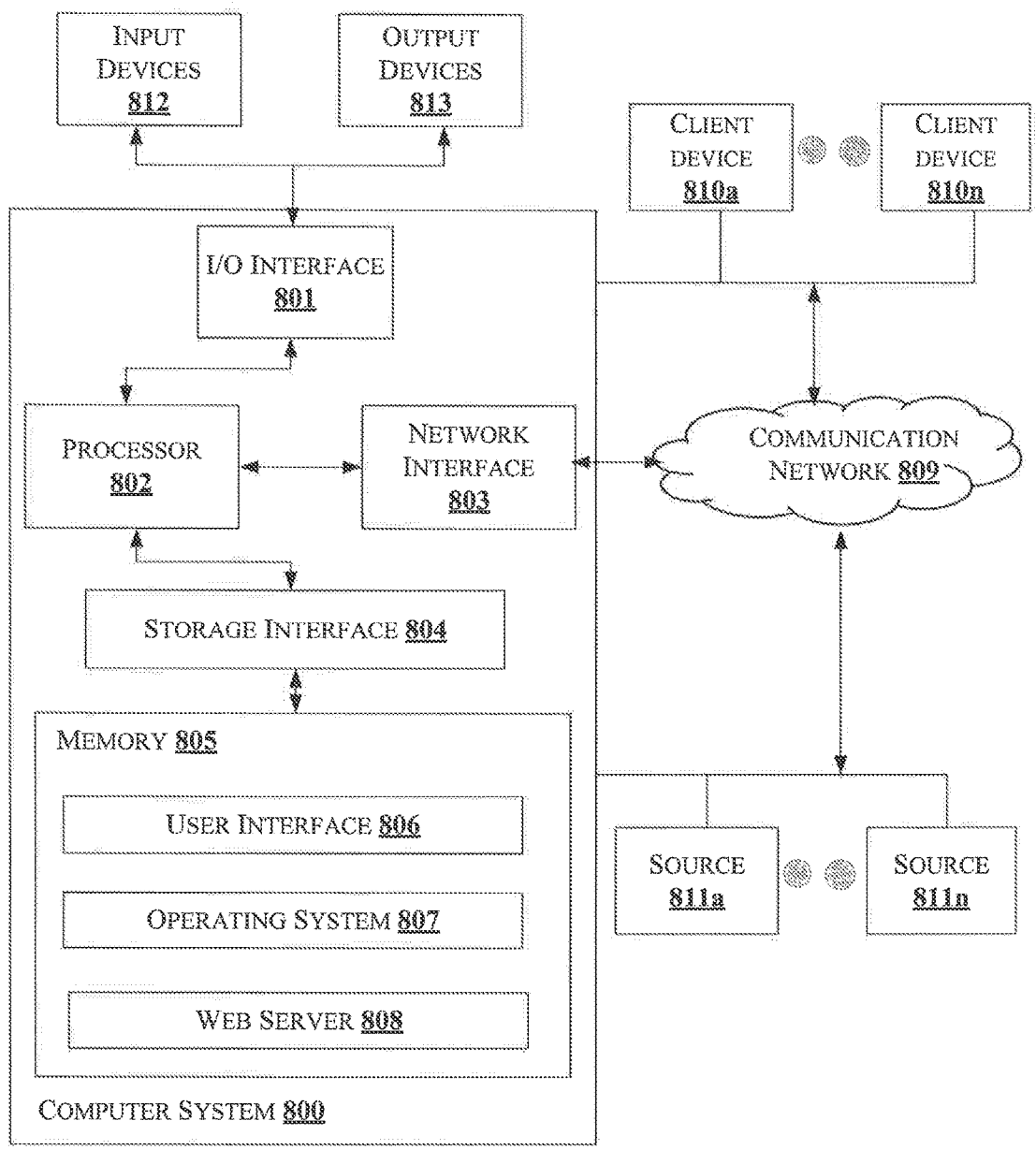

FIGS. 4 (a-f), 5 and 6 illustrates exemplary embodiments of report generation of application in accordance with some embodiments of the present disclosure;

FIG. 7 shows a flowchart illustrating a method for monitoring performance of applications for an entity in accordance with some embodiments of the present disclosure;

FIG. 8 illustrates a block diagram of an exemplary computer system for implementing embodiments consistent with the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure are related to a method for monitoring performance of applications for an entity. The applications herein referred to as software applications and/or computer programming applications and/or device applications etc. The entity refers to organization, company, industry, department, enterprise, establishment etc. The entity uses the applications for analyzing performance of projects developed for the entity and/or a third party entity. The applications run using one or more entity variables associated with the entity. The one or more entity variables include, Central Processing Unit (CPU) of the entity and/or third party entity used for running the applications, Virtual Memory (VMs) of the entity and/or third party entity used for storing data of the applications, disks of client device and/or the entity and/or the third party entity utilized for storing the data of the application upon running, network accessed for running the applications, sub-systems servers associated with the entity and/or the third party entity accessed for running the applications, one or more databases accessed for retrieving the data of the application upon running etc.

The embodiments of the present disclosure is related to find trends in performance of the applications and/or deviation/change in performance of the applications, performance factors associated to the performance of the applications and prediction on the performance of the applications due to the effects of performance of the one or more entity variables. The method comprises retrieving performance information associated with an application from one or more sources. The performance information comprises information related to functioning of the application, performance of an operating system of the entity and/or third party entity, performance of servers of the entity and/or the third party entity utilized towards running of the application, performance of one or more databases associated with the application, historical performance associated with the application, and performance associated with the application based on user inputs. The one or more sources include, without limitations, client devices using the application, servers of the entity and/or the third party entity being utilized for the application, sub-systems servers of the entity and/or the third party entity being utilized for the application, Virtual Memories (VMs) of the client devices and/or the entity and/or the third party entity, disks of the client devices and/or the entity and/or the third party entity, servers containing the databases accessed for the application that are associated with the client devices and/or the entity and/or the third party entity, and servers providing the network details utilized for the application. In an embodiment, the performance information is retrieved at regular time intervals. Then, the method comprises analyzing performance of the application using the retrieved performance information. The performance of the application is analyzed using transaction level analysis, application level analysis, operating system analysis, server based analysis, and database level analysis. Then, the method identifies the one or more entity variables affecting the performance of the application from the analyzed performance of the application. The method comprises determining trends of the performance of the application, deviations in the performance of the application, performance data related to the performance of the application, and prediction data related to predicted performance of the application based on the identification for monitoring the performance of application for the entity.

In an embodiment, the trends, the deviations, the performance data and the prediction data is determined by comparing the analyzed performance of the application with a predefined performance data of corresponding application. The trends, the deviations, the performance data and the prediction data are/is highlighted in the at least one report based on the comparison. The method further comprises generating at least one report corresponding to the trends, the deviations, the performance data and the prediction data. The at least one report comprises comparison report, detail report, Hyper Text Mark-up Language (HTML) report, dashboard page report, business signoff report, aggregated report etc. The trends, and/or the deviations, and/or the performance data and/or the prediction data depends on version of the application being used. The analyzed performance of the application and the at least one report are provided in one or more visual formats on a display unit associated with the monitoring system.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
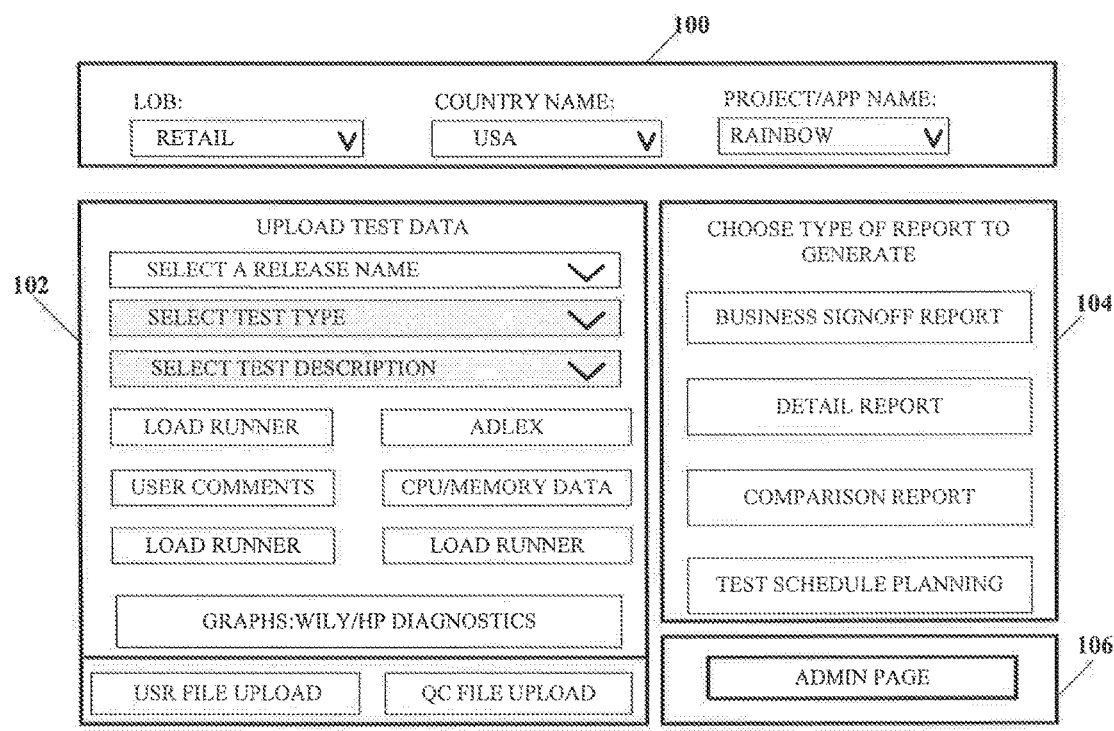
FIG. 1 illustrates an exemplary report generation of an application for an entity in accordance with some embodiments of the present disclosure.

FIG. 1 illustrates the at least one report to be generated for a particular version of a project or an application being used for analyzing the performance of the application for the entity. At block 100, a project or application named "Rainbow" is selected. At block 102, application release name i.e. version details of the application, type of test and text description is provided to run a desired application of a particular version as per the test description and test type being selected. Upon running the application, the trends and/or the deviations, and/or the performance data and/or prediction data of the predicted performance of the application is generated in a report form whose options are given at block 104. The block 106 shows an admin page where an end user or the client can provide their inputs for affecting the performance of the application.

Figure 2:
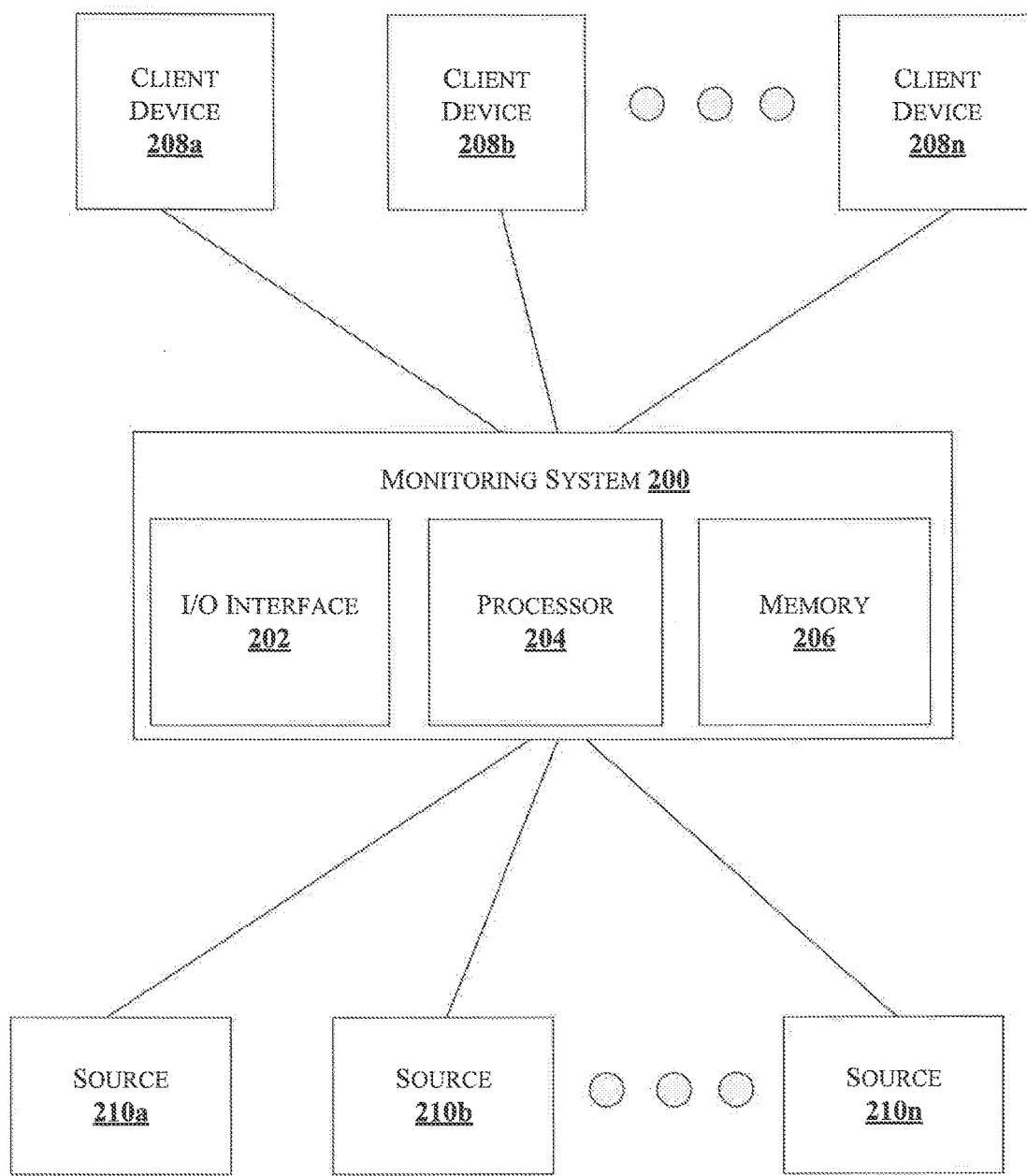
FIG. 2 illustrates an exemplary embodiment of environment for monitoring performance of application for an entity in accordance with some embodiments of the present disclosure.

FIG. 2 illustrates an exemplary embodiment of environment for monitoring performance of application for an entity in accordance with some embodiments of the present disclosure.

In one implementation, a monitoring system 200 is disclosed to monitor the performance of the application for the entity. The monitoring system 200 may be implemented in a variety of computing systems, such as a laptop computer, a desktop computer, a Personal Computer (PC), a notebook, a smartphone, a tablet, e-book readers (e.g., Kindles and Nooks), a workstation, a mainframe computer, a server, a network server, and the like. In one example, the monitoring system 200 is associated to an entity. The entity includes, but is not limited to, business organisation, industry, company, establishment, department etc. In one implementation, the entity is one such environment which uses projects i.e. applications for analysing various working details of the entity and/or of a third party entity. The entity and/or the third party entity are associated to one or more infrastructures (not shown in FIG. 2). The one or more infrastructures include, but are not limited to, operating systems for running the applications, network interface for connecting to Internet for running the applications, sub-systems supporting the applications, servers utilized for running the applications, databases accessible for running the applications, local disks utilized for the applications, memories of the applications, Virtual Memory (VM) servers for providing VMs for the applications and any such infrastructure which could be utilized for the applications.

In one implementation, the applications herein include, without limitations, software applications, computer applications, etc. In one implementation, the applications are implemented to analyse various sections, segments, divisions, sub-divisions, parts etc. of application products, application modules, computer modules, data models, simulations, prototypes etc. In an embodiment, the applications comprise one or more versions or releases. The implementation of the applications involves using of the one or more infrastructures. Thus, performance of the applications depends on performance of the one or more infrastructures. The performance of the applications are monitored by the monitoring system 200 using one or more components which are explained in detail in below sections of the description. The monitoring system 200 is communicatively connected to one or more client devices 208a, 208b, . . . , 208n (collectively referred to 208) and one or more sources 210a, 210b, . . . , 210n (collectively referred to 210) over a communication network (not shown in FIG. 2).

Examples of the one or more client devices 208 include, but are not limited to, a desktop computer, a portable computer, a mobile phone, a handheld device, a workstation. The one or more client devices 208 may be used by various stakeholders or end users or user of the enterprise. In an embodiment, the one or more client devices 208 are used by associated stakeholder or the end user or the user to input name of an application, version details of the application, test type and description for testing the application, kind of reports related to the performance of the application to be generated and/or user inputs. The stakeholders or the end users or the user includes, but is not limited to, an administrator, a developer, a tester, a manager, an editor, an Information Technology (IT) personnel, Business Intelligence (BI) specialists, data scientists etc. In an embodiment, the stakeholder or the end user or the user may include the client devices 208 itself capable of performing such actions performed by the user such as those included in this disclosure. Further, the one or more client devices 208 itself can be the monitoring system 200 capable of monitoring the performance of the application. In one implementation, the one or more client devices 208 may include an input/output (I/O) interface for communicating with input/output (I/O) devices (not shown in FIG. 2). The one or more client devices 208 are installed with one or more interfaces (not shown in FIG. 2) like software and/or hardware to support one or more communication links (not shown) for utilising the one or more infrastructures associated to the entity for running the application and for accessing the application. In an embodiment, the one or more client devices 208 communicate with the communication network via a network interface (not shown in FIG. 2).

The one or more sources 210 are the one or more infrastructures associated with the entity and to the running of the applications. The one or more sources 210 also include the one or more client devices 208 which in a scenario is accessible for running the application and which is responsible for affecting the performance of the application. The one or more sources 210 also include, without limitation, such source from which the user inputs are received affecting the performance of the application.

In the illustrated FIG. 2, the monitoring system 200 comprises the I/O interface 202, at least one central processing unit ("CPU" or "processor") 204, and a memory 206 in accordance with some embodiments of the present disclosure.

The I/O interface 202 is a medium through which name of an application, version details of the application, test type and description for testing the application, kind of reports related to the performance of the application to be generated, and the user inputs are received from the one or more client devices 208. The I/O interface 202 is configured to receive performance information related to the performance of the application from the one or more sources 210 and/or the one or more client devices 208. Further, the I/O interface 202 is configured to provide analysed performance of the application and/or at least one report being generated in one or more visual formats to a display unit associated with the monitoring system 200. The I/O interface 202 is coupled with the processor 204.

The processor 204 may comprise at least one data processor for executing program components for executing user- or system-generated application for monitoring the performance of the application based on the performance of the one or more sources, the user inputs and the application itself. The processor 204 is configured to retrieve the performance information associated with the application being chosen by the user from the one or more sources 210. The processor 204 retrieves the performance information in a predefined time intervals and based on the name of the application, the version details of the application, the test type and description of the application, and the user inputs. The processor 204 analyses performance of the application using the retrieved performance information. The processor 204 identifies the one or more entity variables which are the one or more sources 210 that affect the performance of the application from the analysed performance of the application. The processor 204 determines trends of the performance of the application, deviations in the performance of the application, performance data related to the performance of the application, and prediction data related to predicted performance of the application based on the identification of the one or more entity variables. The processor 204 determines trends, the deviations, the performance data and the prediction data depending on the version of the application being used. The processor 204 compares the analysed performance of the application with a predefined performance data of corresponding application to determine the trends, the deviations, the performance data and the prediction data of the application. The processor 204 generates the at least one report corresponding to the trends, the deviations, the performance data and the prediction data. The processor 204 is configured to highlight the trends, the deviations, the performance data and the prediction in the at least one report being generated based on the comparison. The monitoring of the performance of the application is performed by various modules which are explained in following description. The various modules are executed by the processor 204 of the monitoring system 200.

The memory 206 stores instructions which are executable by the at least one processor 204. In an embodiment, the memory 206 stores performance information, time interval information, analysed data, entity variables data, trend data, deviation data, performance data, and prediction data. In an embodiment, the performance information, the time interval information, the analysed data, the entity variables data, the trend data, the deviation data, the performance data, and the prediction data along with predefined performance data are stored as one or more data required for monitoring the performance of the application. The one or more data are described in the following description of the disclosure.

Figure 3:
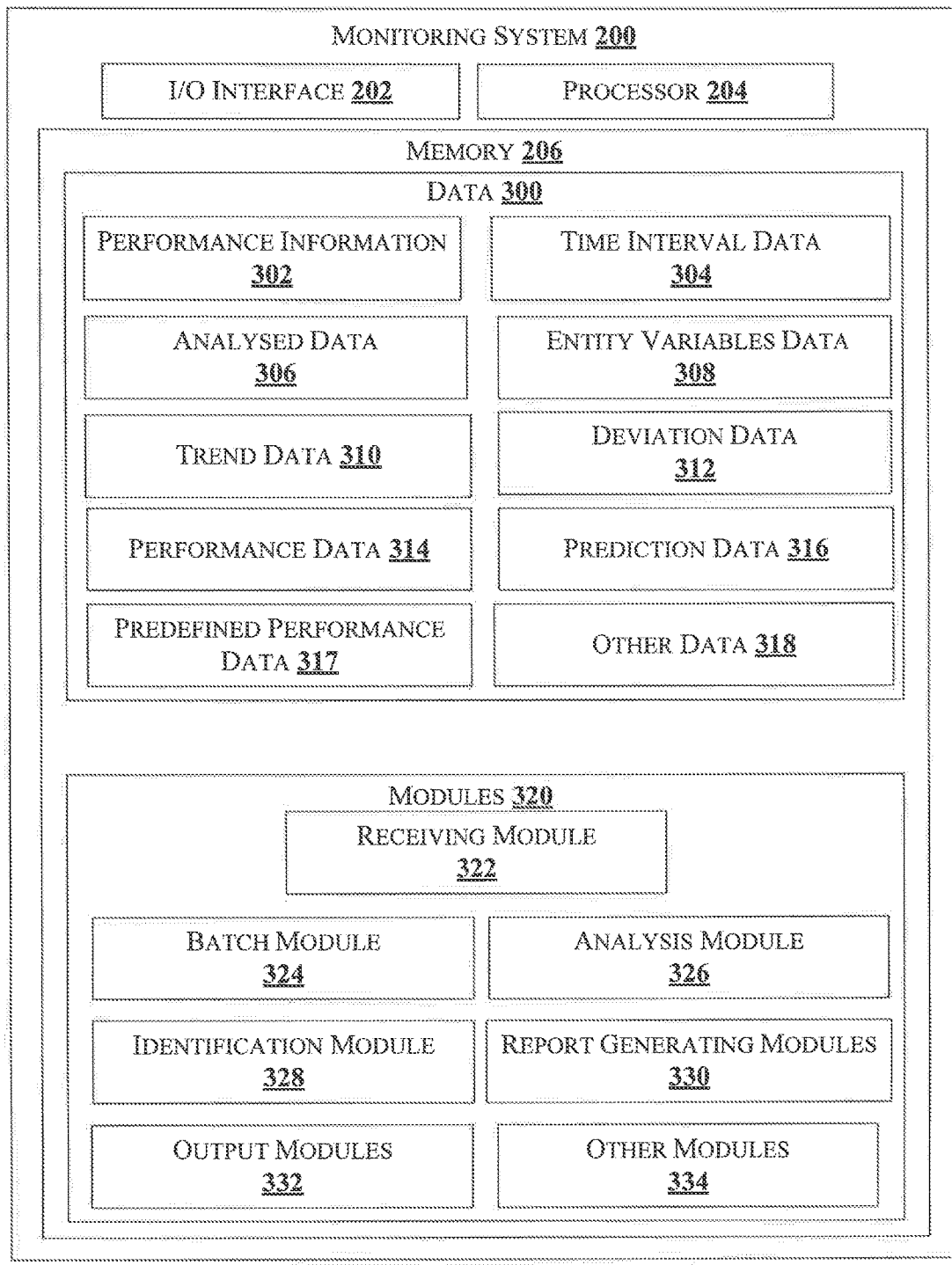
FIG. 3 illustrates a block diagram of an exemplary monitoring system with various data and modules for monitoring performance of application for an entity in accordance with some embodiments of the present disclosure.

FIG. 3 illustrates a block diagram of the exemplary monitoring system 200 with various data and modules for monitoring the performance of the application for the entity time in accordance with some embodiments of the present disclosure. In the illustrated FIG. 3, the one or more data 300 and the one or more modules 320 stored in the memory 206 are described herein in detail.

In an embodiment, the one or more data 300 may include, for example, the performance information 302, the time interval information 304, the analyzed data 306, the entity variables data 308, the trend data 310, the deviation data 312, the performance data 314, and the prediction data 316, and other data 318 for monitoring the performance of the application.

The performance information 302 refers to information related to the application and the one or more entity variable i.e. sources 210. Particularly, the performance information 302 includes, without limitations, functioning of the application, performance of an operating system, performance of servers utilized towards running of the application, performance of one or more databases associated with the application, historical performance associated with the application, and performance associated with the application based on user inputs.

The functioning of the application refers to application statistics which are involved in measuring any performance improvements in functioning of the application. For example, the application statistics includes a daily summary of user transactions during working period. Further, the application statistics includes, without limitation, precise details of kinds of transactions performed for running the application and the response times for each kind of transaction. The application statistics includes, without limitations, detailed statistics related to decomposition of each transaction time spent in the one or more entity variables. In such a case, the one or more entity variables include the servers of the entity and/or the third party entity, the network usage for the application, the one or more databases for the application etc.

The performance of the operating system includes, without limitations, operating system statistics associated with the entity and/or the third party entity. The operating system statistics involves information on the usage and performance of the main hardware components of the system, as well as the performance of the operating system itself. The operating system statistics is crucial for detecting potential resource exhaustion, such as CPU cycles and physical memory, and for detecting bad performance of peripherals, such as disk drives. The operating system statistics are only an indication of how the hardware and operating system are working. In an embodiment, the operating system statistics also include, without limitation, details on operating system of all the servers of the entity and/or the third party entity. Further, the operating system statistics includes, but is not limited to, Central Processing Unit (CPU) statistics, VMs statistics, disks statistics and network statistics. The CPU statistics refers to CPU utilization of the one or more sources 210 and/or multi-processor environments, which can detect single-threading and scalability issues. The CPU usage is referred to as time spent in user space or mode and time spent in kernel space or mode. The VMs statistics refers to paging or swapping activity on the monitoring system 200. The VMs statistics is required since the monitoring system performance can degrade rapidly and unpredictably when paging or swapping occurs. Thus, the VMs statistics can detect memory leaks due to a programming failure to unallocated memory taken from process heaps. The VMs statistics are used to validate that memory usage does not increase after the monitoring system 200 has reached a steady state after startup. Such a problem is particularly present on shared server applications on middle tier machines where session state may persist across user interactions, and on completion state information that is not fully unallocated. The disk statistics refers to databases residing on a set of disks. Also, the disk statistics includes, without limitations, performance of the I/O subsystem which is crucial for the performance of the one or more databases. In an embodiment, the disk statistics are a current response time and a length of the disk queues. The disk statistics is required for checking optimal performance of the disk and/or overworking of the disk. For example, if a disk shows response times over 20 milliseconds, then the disk is over-worked that is identified as a bottleneck or an error. If disk queues starts to exceed two, then the disk is a potential bottleneck of the application. The network statistics are used to determine optimal performance and/or overloading of a network or network interface. For example, network latency can be taken as network statistics which involves actual user response time towards the application.

The performance of servers utilized towards running of the application refers to one or more servers utilized for running the application. The one or more servers also include, without limitation, sub-application servers or sub-servers from which operations or services towards the application can be fetched and used. For example, the operations or services includes, without limitations, average response time, volume, errors, and exceptions etc.

The performance of one or more databases associated with the application refers to the one or more databases utilized for the application. The performance of the one or more databases includes, without limitations, database statistics which contains information on type of load on the one or more databases along with internal and external resources used by the one or more databases. In an embodiment, exhaustion of the one or more databases implies bottlenecks or errors in the application. The database statistics include, but are not limited to, buffer cache, shared pool, wait events, etc. The buffer cache manages blocks read from the disk into buffers of the memory of the monitoring system 200 and/or the entity and/or the third entity. The buffer cache holds information in the buffers which are most recently used and/or which are modified in normal database operation. In an embodiment, for retrieving best query performance, a user query accesses all required data blocks within the buffer cache. The shared pool contains information related to user sessions, shared data structures used by all the database sessions, and the dictionary cache. In an embodiment, the shared pool allows analysis of Sequential Query Language (SQL) statements run in the one or more databases. Such a way of querying the SQL statements is advantageous when the monitoring system 200 is unaware of application source codes. The wait events refers to time for which the running the application is delayed. The wait events are required because of reason described herein. In one implementation, in the process of usual database server operations, there are times when processes need to share resources or synchronize with other processes, for example, during allocating memory in the shared pool or waiting for a lock. Likewise, there are times when the database process gives control to external code or other processes out of its control, for example, for performing I/O and waiting for the log writer to synchronize the redo log. In such cases, the user process stops working and starts waiting. Such wait time becomes part of the eventual user response time. If there are multiple processes queuing on a shared resource or demanding the same external resource, then the one or more databases start to single-thread, where the scalability is impacted.

The historical performance associated with the application refers to performance information occurred in the past running and/or execution of the application.

The performance associated with the application based on user inputs includes, without limitations, preferences of the user for running the application, trend analysis logics of the user, test related user's observations along environment code drop details required for trend and deviation analysis. The user inputs further include, without limitations, information related to on-going release i.e. version of the application and the information of the one or more sources need to be monitored.

The time interval information 304 refers to time intervals for which the performance information are required to be retrieved from the one or more sources 210 and/or the one or more client devices 208.

The analyzed data 306 refers to such data which are analyzed from the performance of the application and/or from the performance of the one or more entity variables i.e. the one or more sources 210.

The entity variables data 308 refers to details of the one or more sources 210 involved in the current performance of the application. Also, the entity variables data 308 also include the one or more sources 210 which could be involved in predicted performance of the application in future.

The trend data 310 refers to data relating to trends of the performance of the application along with trends of the one or more sources 210 involved in performance of the application.

The deviation data 312 refers to details relating to deviation of the performance of the application. The deviation data 312 refers to deviation of performance of the one or more sources 210 involved in performance of the application.

The performance data 314 refers to current performance of the application and/or current performance of the one or more sources 210 involved for the performance of the application.

The prediction data 316 refers to prediction of the performance of the application after a particular time period. Also, the prediction data 316 refers to the prediction of performance of the one or more sources 210 involved for the performance of the application.

The predefined performance data 317 refers to performance information along with information on time intervals, analyzed information, trends analysis information, deviation analysis information, entity variables information, performance details and prediction information which are predefined and stored in the memory 206.

The other data 318 may refer to such data which can be referred for monitoring the performance of the application.

In an embodiment, the one or more data 300 in the memory 206 are processed by the one or more modules 320 of the monitoring system 200. The one or more modules 320 may be stored within the memory 206 as shown in FIG. 3. In an example, the one or more modules 320, communicatively coupled to the processor 204, may also be present outside the memory 206 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In one implementation, the one or more modules 320 may include, for example, a receiving module 322, a batch module 324, an analysis module 326, an identification module 328, a report generating module 330, and an output module 332. The memory 206 may also comprise other modules 334 to perform various miscellaneous functionalities of the monitoring system 200. It will be appreciated that such aforementioned modules may be represented as a single module or a combination of different modules.

In an embodiment, the receiving module 322 receives the performance information in the predefined time intervals and based on the name of the application, the version details of the application, the test type and description of the application, and the user inputs from the one or more client devices 208. The receiving module 322 receives the performance information associated with the application being chosen by the user from the one or more sources 210 and/or the one or more client devices 208.

The batch module 324 is configured to run at the predefined time intervals to connect to consolidate and collate the performance information along with the user inputs. In an embodiment, the batch module 324 consolidates raw results of the application which are collated using different set of codes. At this stage, the batch module 324 generates an initial report using the raw results. The initial report generated is logically and systematically grouped into various data tables comprising of many attributes. After all data of the initial report is inserted, the batch module retrieves the performance information of the application at a desired date and time. For example, the application level performance details from various existing diagnostics tools are retrieved by the batch module 324. Also, for example, the operating System level performance details such as CPU/Memory utilizations, Page-In/Page-out, Swaps, Queue Data, Scans, I/O usage, etc. for each server are retrieved. The details from various sub-application servers having average response time, volume of data, errors, and exceptions etc. are retrieved.

The analysis module 326 is configured to analyze the performance of the application using the retrieved performance information. Particularly, analysis module 326 determines how an anomaly can impact various statistics of the application and to analyze the bottlenecks i.e. errors for the application. In an embodiment, the analysis of the performance of the application is performed using transaction level analysis, application level analysis, operating system analysis, server based analysis, and database level analysis.

The transaction level analysis includes analysis of the data, for example throughput, hits per second, running Virtual user (Vuser), transaction average response time, etc. Using various dynamic SQL Data Manipulation Language (DML) queries the global metrics of the performance information are retrieved. For example, total pages are the total number of pages played, total Hits is the total number of hits (requests) played, total users launched are the total number of user instances launched, total iterations completed are the sum of the number of times when the Actions Container is executed for each Virtual user, total throughput is the sum of the sizes of the responses to all the requests played, total hit errors are the total number of hits (requests) with errors, total action errors is the total number of logical actions (e.g. JavaScript actions) with errors, average page/s is the average number of pages played per second, average hit/s is the average number of hits (requests) played per second, average request response time is the average of requests response times, average page response time is the average of pages response times, average throughput is the average throughput for server responses (downstream), error rate is the percentage of hits (requests) with errors out of the total number of hits, total duration alerts are the percentage of the total duration of alerts out of the total test duration.

The application level analysis includes data retrieved from various diagnostics tools by considering various counters such as minor garbage collection, major garbage collection, portlets/servlets/Java Server Page (JSPs) average response times, heap data, etc. The application level analysis is typically based on the predefined Service Level Agreement (SLA) for each application layer and matrices. The performance information and the historical performance of the application are consolidated along with the performance of the one or more entity variables.

The operating system analysis includes analysis of operating system level performance counters, for example CPU/memory utilizations, page-in/page-out, swaps, queue data, scans, I/O usage, etc. for each server. For example, the operating system analysis may involve check for CPU utilization in user and kernel space for the total system and on each CPU, confirm that there is no paging or swapping, check that network latencies between machines are acceptable and as per SLA or not, identified disks with poor response times or long queues exists and confirm that there are no hardware errors.

The server based analysis includes analysis of the various sub-application server data such as operation/services statistics for example, average response time, volume, errors, and exceptions etc. The server based analysis for any type of inconsistency, which might be present in various performance counters like garbage collection matrix, CPU/memory utilizations, errors per interval, portlet and servlet response times, etc.

The database level analysis includes analysis of the various databases performance counters, for example, top 10 time taking SQL Queries, elapsed time, top 5 timed foreground wait events, etc. For example, CPU bottlenecks whether the system CPU bound by SQL or some other application, undersized memory structures to check whether SQL memory structures, such as the SGA, PGA, and buffer cache, adequately sized, I/O capacity issues, high load SQL statements to check whether any SQL statements present which are consuming excessive system resources, high load Programming Load (PL)/SQL execution and compilation, Real Application Cluster (RAC) specific issues, sub-optimal use of SQL by the application whether any problems with poor connection management, excessive parsing, or application level lock contention exists, database configuration issues whether any evidence of incorrect sizing of log files, archiving issues, excessive checkpoints, or sub-optimal parameter settings present, and concurrency issues to check whether any buffer busy problems exist.

The identification module 328 identifies the one or more entity variables affecting the performance of the application from the analyzed performance of the application. Further, the identification module 328 determines the trends of the performance of the application, the deviations in the performance of the application, the performance data related to the performance of the application, and the prediction data related to predicted performance of the application based on the identification of the one or more entity variables. The determining is performed by comparing the analyzed performance of the application with a predefined performance data 317 of corresponding application. The determining of the trends includes the progress of the performance of the application. The deviation refers to change in the performance of the application as compared to the predefined performance data 317. The performance data refers to the current performance of the application. The prediction data refers to the predicted performance of the application. In an embodiment, the determining of the trends of the performance of the application, the deviations in the performance of the application, the performance data related to the performance of the application, and the prediction data related to predicted performance depends on the version of the application being run or used. In an embodiment, the identification module 328 uses the current performance information and the historic details of the application. The identification module 328 generates an outline of how the application is performing over time. Also, the identification module 328 predicts of upcoming performance issues. The performance impact of major events, such as application implementations, infrastructure upgrades and site redesigns are tracked by the identification module 328.

The report generating module 330 generates the at least one report corresponding to the at least one of the trends, the deviations, the performance data and the prediction data. The at least one report includes, without limitation, detailed report, comparison report, business signoff report, dashboard report, I-HTML report etc. The HTML report provides an overview of the application along with graphs and summarized data on factors, without limitation, the response time, throughput, hits per seconds, errors per interval, HyperText Transfer Protocol (HTTP) errors etc. in graphical and tabular format. The detailed report provides an in-depth analysis of test of the application based on each infrastructure layers. FIGS. 4(a-f), 5 and 6 show the interface for generating the at least one report. FIGS. 4a-4f shows the detailed report being generated. FIG. 4a is a technical report for providing view of performance information to assist the user to make decision for any kind of performance improvement recommendations on the basis of performance results.

FIG. 4b is a part of detail report which provides basic information of the test details showing the number of user running the test, the start and end time of the test, the duration of ramp up of 4886 users, the duration for which the test is in steady state and the number of load runner scripts in the test. Also, the illustrated FIG. 4b shows the environmental changes or code changes in the test environment prior to the running of the test. Further, the illustrated FIG. 4b shows range of transaction response time of each module running the test. FIG. 4b, for example, displays top 10 transactions along with their percentage of failure, particularly, when the percentage of failure is more than 10%. Also, top 10 transaction names along with their average response time whose average response time is more than 6 seconds are displayed. For example, under test observations, data from quality center is fetched for defect numbers which were raised as part of test issues along with observations of the user. Further, in next figure of 4b (continuation), average response time i.e. 90 percentile response time and the total percentage of transaction which are under pre-set SLA range for a given module. In an embodiment, the SLA numbers can be configured to any other numbers. Next, the FIG. 4b showing detailed response times, provides the details on a transaction level where the SLA for each transaction under a module, total number of passed and failed transaction, their average response time, 90 percentile response time and the total percentage of the SLA which the transaction has passed have been showed. In further FIG. 4b, the count of all the transactions which were below 5 seconds of response time, which are between 6 to 12 seconds, which are between 12 to 45 seconds and which are above 45 seconds are displayed. Also, the transactions which are below 5 seconds of 90 percentile of response time, which are between 6 to 12 seconds, which are between 12 to 45 seconds and which are above 45 seconds are displayed. FIG. 4c shows average response time for the whole duration of the test which includes all the transactions of the test. FIG. 4c shows running Vuser graph and throughput graph for the test duration. FIG. 4d displays all the ESB operations along with the end system (channel). Here, total successful ESB operations, end to end response time in milliseconds is provided. FIG. 4e shows the analyzed data for all the end system hosts. Further, total pass and fail transactions, average response time to respond and the total number of errors generated during the test is showed. FIG. 4f displays the maximum CPU and memory utilization during the test for the all servers.

Figure 5:
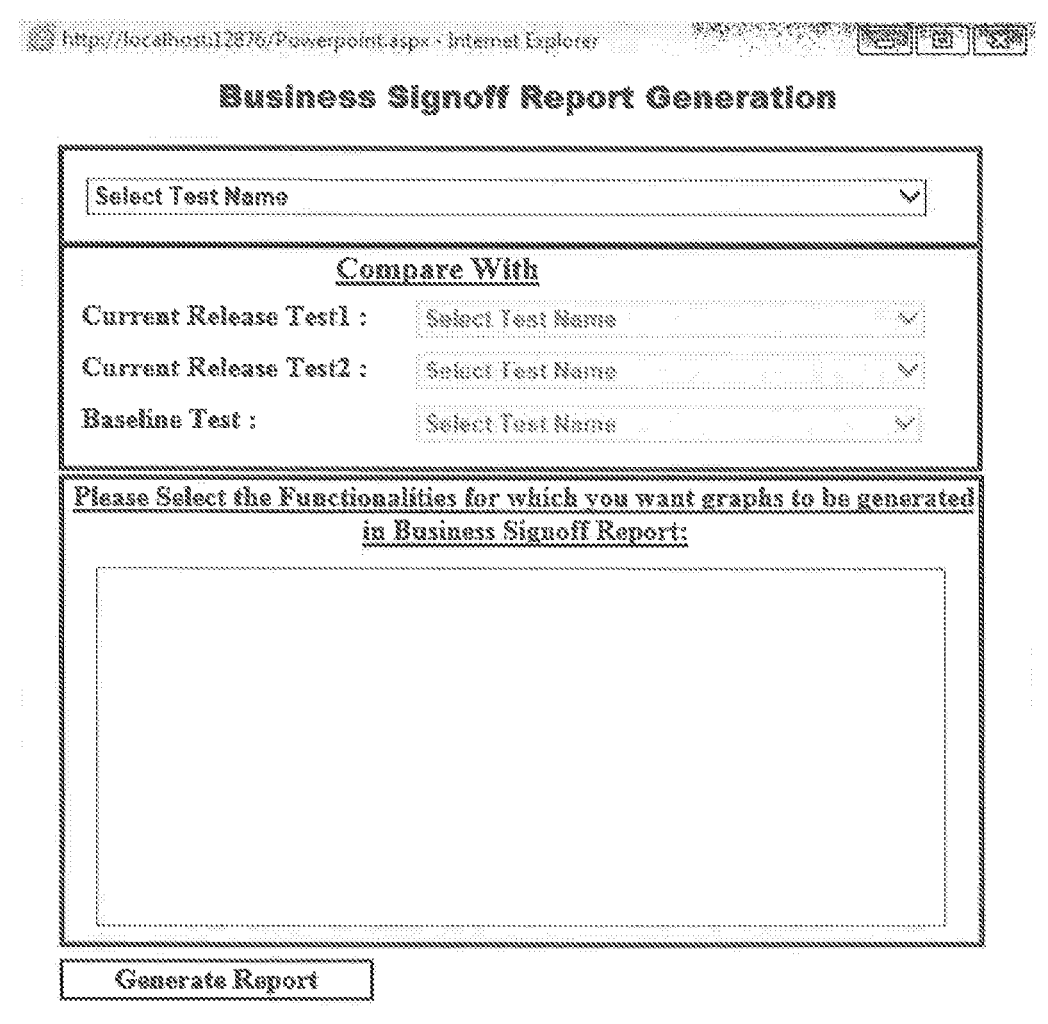

FIG. 5 shows the business signoff report being generated. The user is provided with options of selecting 3 tests from same release and one test from the same or different release which are considered as baseline test. In such a way, 3 tests are compared with the baseline tests and improvement or failure comparisons can be seen. The user is provided with options to select module names from the third section which gets enabled as soon as user selects a test from first section. The business sign off report is generated based on selection from $1^{st}$, $2^{nd}$ and $3^{rd}$ section choices by the user. The improvements of previous release and in the current release can be analyzed.

The comparison report is shown in FIG. 6 which provides multiple comparison performance results along with trend and deviations analysis for the data selected. The dashboard report is a static page which is automatically updated with the latest performance results, HP quality center data, performance center data, and overall summarized analysis of the performance results day wise, giving management the overall idea of how the performance involved on in the environment.

The output module 332 provides the analyzed performance of the application and the at least one report in the one or more visual formats on the display unit associated with the monitoring system 200. The output module 332 highlights the trends, the deviations, the performance data and the prediction data based on the comparison.

FIG. 7 shows a flowchart illustrating a method 700 for monitoring performance of applications for the entity in accordance with some embodiments of the present disclosure.

At block 702, the performance information associated with the application is retrieved from the one or more sources 210. In an embodiment, the performance information comprises information related to the functioning of the application, the performance of an operating system, performance of servers utilized towards running of the application, the performance of one or more databases associated with the application, the historical performance associated with the application, and the performance associated with the application based on user inputs. The performance information is retrieved at predefined time intervals.

At block 704, the performance of the application is analyzed using the retrieved performance information. In an embodiment, the performance of the application is analyzed using the transaction level analysis, the application level analysis, the operating system analysis, server based analysis, and the database level analysis.

At block 706, the one or more entity variables affecting the performance of the application are identified from the analyzed performance of the application.

At block 708, a condition is checked whether the analyzed performance of the application with the predefined performance data of corresponding application. If the analyzed performance of the application does match with the predefined performance data of corresponding application, then the process goes to block 712 where the process ends. If the analyzed performance of the application matches with the predefined performance data of corresponding application, then the process goes to block 710.

At block 710, the trends of the performance of the application, deviations in the performance of the application, performance data related to the performance of the application, and prediction data related to predicted performance of the application are determined based on the identification. In an embodiment, the at least one report corresponding to the trends, the deviations, the performance data and the prediction data is generated. In an embodiment, determining the trends, the deviations, the performance data and the prediction data depends on version of the application being used. In an embodiment, the analyzed performance of the application and the at least one report in the one or more visual formats on the display unit associated with the monitoring system 200. In an embodiment, the trends, the deviations, the performance data and the prediction data is highlighted in the at least one report based on the comparison.

Computer System

FIG. 8 illustrates a block diagram of an exemplary computer system 800 for implementing embodiments consistent with the present disclosure. In an embodiment, the computer system 800 is used to implement the monitoring system 200. The computer system 800 monitors the performance of the application. The computer system 800 may comprise a central processing unit ("CPU" or "processor") 802. The processor 802 may comprise at least one data processor for executing program components for executing user- or system-generated sensor inputs. The processor 802 may include specialized processing units such as integrated system (bus) controllers, memory management control units, floating point units, graphics processing units, digital signal processing units, etc.

The processor 802 may be disposed in communication with one or more input/output (I/O) devices (not shown) via I/O interface 801. The I/O interface 801 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 801, the computer system 800 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 800 is connected to the one or more sources 811a, . . . 811n and the one or more client devices 810a, . . . ,810n through a communication network 809. The processor 802 may be disposed in communication with the communication network 809 via a network interface 803. The network interface 803 may communicate with the communication network 809. The network interface 803 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 809 may include, without limitation, a direct interconnection, local area network (LAN), wide area network (WAN), wireless network (e.g., using Wireless Application Protocol), the Internet, etc. Using the network interface 803 and the communication network 809, the computer system 800 may communicate with the one or more sources 811a, . . . ,811n, and the one or more client devices 810a, . . . ,810n. The network interface 803 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 809 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 802 may be disposed in communication with a memory 805 (e.g., RAM, ROM, etc. not shown in FIG. 8) via a storage interface 804. The storage interface 804 may connect to memory 805 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 805 may store a collection of program or database components, including, without limitation, user interface 806, an operating system 807, web server 808 etc. In some embodiments, computer system 800 may store user/application data 806, such as the data, variables, records, etc. as described in this disclosure. Such databases may be implemented as fault-tolerant, relational, scalable, secure databases such as Oracle or Sybase.

The operating system 807 may facilitate resource management and operation of the computer system 800. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

In some embodiments, the computer system 800 may implement a web browser 807 stored program component. The web browser 808 may be a hypertext viewing application, such as Microsoft Internet Explorer, Google Chrome, Mozilla Firefox, Apple Safari, etc. Secure web browsing may be provided using Secure Hypertext Transport Protocol (HTTPS), Secure Sockets Layer (SSL), Transport Layer Security (TLS), etc. Web browsers 808 may utilize facilities such as AJAX, DHTML, Adobe Flash, JavaScript, Java, Application Programming Interfaces (APIs), etc. In some embodiments, the computer system 800 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 800 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

Embodiments of the present disclosure provides online technique for monitoring the performance of the application in real-time. It keeps count on each application log files.

Embodiments of the present disclosure highlight the errors which help the client to view and decide on correcting the errors.

Embodiments of the present disclosure reduce manual errors by monitoring the performance of the application dynamically. The embodiments do not need any kind of application installation for capturing the exceptions.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 200 | Monitoring System |
| 202 | I/O Interface |
| 204 | Processor |
| 206 | Memory |
| 208a, . . . , 208n | Client Devices |
| 210a, . . . , 210n | Sources |
| 300 | Data |
| 302 | Performance Information |
| 304 | Time Intervals Data |
| 306 | Analyzed Data |
| 308 | Entity Variables Data |
| 310 | Trend Data |
| 312 | Deviation Data |
| 314 | Performance Data |
| 316 | Prediction Data |
| 317 | Predefined Performance Data |
| 318 | Other Data |
| 320 | Modules |
| 322 | Receiving Module |
| 324 | Batch Module |
| 326 | Analysis Module |
| 328 | Identification Module |
| 330 | Report Generating Module |
| 332 | Output Module |
| 334 | Other Modules |
| 800 | Computer System |
| 801 | I/O Interface |
| 802 | Processor |
| 803 | Network Interface |
| 804 | Storage Interface |
| 805 | Memory |
| 806 | User Interface |
| 807 | Operating System |
| 808 | Web Server |
| 809 | Communication Network |
| 810a, . . . , 810n | Client Devices |
| 811a, . . . , 811n | Sources |
| 812 | Input Devices |
| 813 | Output Devices |

What is claimed is:

1. A method for monitoring performance of applications for an entity, the method comprising:

retrieving, by a monitoring system, performance information associated with an application from one or more sources, the application comprising a plurality of application layers and matrices;

analyzing, by the monitoring system, performance of the application using the retrieved performance information, wherein the analyzing further comprises determining an impact of an anomaly on one or more statistics of the application using transaction level analysis and application level analysis, wherein the transaction level analysis comprises analysis of data comprising throughput, hits per second, running Virtual user (Vuser), and transaction average response time, and wherein the application level analysis comprises diagnostic data determined based on a plurality of counters comprising minor garbage collection, major garbage collection, portlets average response times, and heap data, and wherein the application level analysis is based on a predefined Service Level Agreement (SLA) for each application layer and matrix;

identifying, by the monitoring system, one or more entity variables affecting the performance of the application from the analyzed performance of the application; and determining, by the monitoring system, at least one of trends of the performance of the application, deviations in the performance of the application, performance data related to the performance of the application, and prediction data related to predicted performance of the application based on the identification for monitoring the performance of application for the entity.

2. The method as claimed in claim 1 further comprising generating by the monitoring system, at least one report corresponding to the at least one of the trends, the deviations, the performance data and the prediction data.

3. The method as claimed in claim 1, wherein the performance information comprises information related to at least one of functioning of the application, performance of an operating system, performance of servers utilized towards running of the application, performance of one or more databases associated with the application, historical performance associated with the application, and performance associated with the application based on user inputs.

4. The method as claimed in claim 1, wherein the performance information is retrieved at predefined time intervals.

5. The method as claimed in claim 1, wherein analyzing the performance of the application is performed using at least one of operating system analysis, server based analysis, and database level analysis, wherein the operating system analysis comprises analysis of operating system performance counters comprising CPU utilizations, memory utilizations, page-in/page-out, swaps, queue data, scans, and I/O usage, wherein the server based analysis comprises analysis of sub-application server data comprising average response time, volume, errors, and exceptions, and wherein the database level analysis comprises analysis of databases performance counters comprising time taking SQL Queries, elapsed time, timed foreground wait events.

6. The method as claimed in claim 2 further comprising providing, by the monitoring system, at least one of the analyzed performance of the application and the at least one report in one or more visual formats on a display unit associated with the monitoring system.

7. The method as claimed in claim 1, wherein determining by the monitoring system, the at least one of trends, the deviations, the performance data and the prediction data depends on version of the application being used.

8. The method as claimed in claim 7, wherein determining by the monitoring system, the at least one of trends, the deviations, the performance data and the prediction data comprising comparing the analyzed performance of the application with a predefined performance data of corresponding application.

9. The method as claimed in claim 8, wherein the at least one of trends, the deviations, the performance data and the prediction data is highlighted in the at least one report based on the comparison.

10. A monitoring system for monitoring performance of applications for an entity, comprising:
a processor;
a memory communicatively coupled to the processor, wherein the memory stores processor-executable instructions, which, on execution, cause the processor to:
retrieve performance information associated with an application from one or more sources, the application comprising a plurality of application layers and matrices;
analyze performance of the application using the retrieved performance information, wherein the analyzing further comprises determining an impact of an anomaly on one or more statistics of the application using transaction level analysis and application level analysis, wherein the transaction level analysis comprises analysis of data comprising throughput, hits per second, running Virtual user (Vuser), and transaction average response time, and wherein the application level analysis comprises diagnostic data determined based on a plurality of counters comprising minor garbage collection, major garbage collection, portlets average response times, and heap data, and wherein the application level analysis is based on a predefined Service Level Agreement (SLA) for each application layer and matrix;
identify one or more entity variables affecting the performance of the application from the analyzed performance of the application; and
determine at least one of trends of the performance of the application, deviations in the performance of the application, performance data related to the performance of the application, and prediction data related to predicted performance of the application based on the identification for monitoring the performance of application for the entity.

11. The monitoring system as claimed in claim 10, wherein the processor is further configured to generate at least one report corresponding to the at least one of the trends, the deviations, the performance data and the prediction data.

12. The monitoring system as claimed in claim 10, wherein the performance information comprises information related to at least one of functioning of the application, performance of an operating system, performance of servers utilized towards running of the application, performance of one or more databases associated with the application, historical performance associated with the application, and performance associated with the application based on user inputs.

13. The monitoring system as claimed in claim 10, wherein the performance information is retrieved at predefined time intervals.

14. The monitoring system as claimed in claim 10, wherein analyzing the performance of the application is performed using at least one of operating system analysis, server based analysis, and database level analysis, wherein the operating system analysis comprises analysis of operating system performance counters comprising CPU utilizations, memory utilizations, page-in/page-out, swaps, queue data, scans, and I/O usage, wherein the server based analysis comprises analysis of sub-application server data comprising average response time, volume, errors, and exceptions, and wherein the database level analysis comprises analysis of databases performance counters comprising time taking SQL Queries, elapsed time, timed foreground wait events.

15. The monitoring system as claimed in claim 11, wherein the processor is further configured to provide at least one of the analyzed performance of the application and the at least one report in one or more visual formats on a display unit associated with the monitoring system.

16. The monitoring system as claimed in claim 10, wherein determining the at least one of trends, the deviations, the performance data and the prediction data depends on version of the application being used.

17. The monitoring system as claimed in claim 16, wherein determining the at least one of trends, the deviations, the performance data and the prediction data comprising comparing the analyzed performance of the application with a predefined performance data of corresponding application.

18. The monitoring system as claimed in claim 17, wherein the at least one of trends, the deviations, the performance data and the prediction data is highlighted in the at least one report based on the comparison.

19. A non-transitory computer readable medium including instructions stored thereon that when processed by a processor cause a monitoring system for monitoring performance of applications for an entity by performing acts of:
retrieving performance information associated with an application from one or more sources, the application comprising a plurality of application layers and matrices;
analyzing performance of the application using the retrieved performance information, wherein the analyzing further comprises determining an impact of an anomaly on one or more statistics of the application using transaction level analysis and application level analysis, wherein the transaction level analysis comprises analysis of data comprising throughput, hits per second, running Virtual user (Vuser), and transaction average response time, and wherein the application level analysis comprises diagnostic data determined based on a plurality of counters comprising minor garbage collection, major garbage collection, portlets average response times, and heap data, and wherein the application level analysis is based on a predefined Service Level Agreement (SLA) for each application layer and matrix;
identifying one or more entity variables affecting the performance of the application from the analyzed performance of the application; and
determining at least one of trends of the performance of the application, deviations in the performance of the application, performance data related to the performance of the application, and prediction data related to predicted performance of the application based on the identification for monitoring the performance of application for the entity.

20. The medium as claimed in claim 19, wherein the instructions further cause the processor to perform operations comprising further comprising generating at least one report corresponding to the at least one of the trends, the deviations, the performance data and the prediction data.

21. The medium as claimed in claim 19, wherein the performance information comprises information related to at least one of functioning of the application, performance of an operating system, performance of servers utilized towards running of the application, performance of one or more databases associated with the application, historical performance associated with the application, and performance associated with the application based on user inputs.

22. The medium as claimed in claim 19, wherein the performance information is retrieved at predefined time intervals.

23. The medium as claimed in claim 19, wherein analyzing the performance of the application is performed using at least one of operating system analysis, server based analysis, and database level analysis, wherein the operating system analysis comprises analysis of operating system performance counters comprising CPU utilizations, memory utilizations, page-in/page-out, swaps, queue data, scans, and I/O usage, wherein the server based analysis comprises analysis of sub-application server data comprising average response time, volume, errors, and exceptions, and wherein the database level analysis comprises analysis of databases performance counters comprising time taking SQL Queries, elapsed time, timed foreground wait events.

24. The medium as claimed in claim 20, wherein the instructions further cause the processor to perform operations comprising further comprising providing at least one of the analyzed performance of the application and the at least one report in one or more visual formats on a display unit associated with the monitoring system.

25. The medium as claimed in claim 19, wherein determining by the monitoring system, the at least one of trends, the deviations, the performance data and the prediction data depends on version of the application being used.

26. The medium as claimed in claim 25, wherein determining the at least one of trends, the deviations, the performance data and the prediction data comprising comparing the analyzed performance of the application with a predefined performance data of corresponding application.

27. The medium as claimed in claim 26, wherein the at least one of trends, the deviations, the performance data and the prediction data is highlighted in the at least one report based on the comparison.

* * * * *